United States Patent
Bissieres

(10) Patent No.: US 11,834,156 B2
(45) Date of Patent: Dec. 5, 2023

(54) ROLLER GEAR ELEMENT

(71) Applicant: SAFRAN LANDING SYSTEMS, Velizy Villacoublay (FR)

(72) Inventor: Denis Bissieres, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 0 days.

(21) Appl. No.: 17/774,907

(22) PCT Filed: Nov. 6, 2020

(86) PCT No.: PCT/EP2020/081392
§ 371 (c)(1),
(2) Date: May 6, 2022

(87) PCT Pub. No.: WO2021/089852
PCT Pub. Date: May 14, 2021

(65) Prior Publication Data
US 2022/0388636 A1 Dec. 8, 2022

(30) Foreign Application Priority Data

Nov. 8, 2019 (FR) ....................................... 1912588

(51) Int. Cl.
*B64C 25/36* (2006.01)
*F16H 1/06* (2006.01)
*F16H 55/10* (2006.01)

(52) U.S. Cl.
CPC ............... *B64C 25/36* (2013.01); *F16H 1/06* (2013.01); *F16H 55/10* (2013.01)

(58) Field of Classification Search
CPC . F16H 55/10; F16H 1/06; B64C 25/36; B64C 25/405
See application file for complete search history.

(56) References Cited

U.S. PATENT DOCUMENTS 1,817,019 A * 8/1931 Ruetschi ................. F16H 55/10
74/461
9,341,247 B2 * 5/2016 Lim ......................... F16H 19/04
(Continued)

FOREIGN PATENT DOCUMENTS

| CN | 102678880 A | 9/2012 |
|----|-------------|--------|
| EP | 2700848 A2 | 2/2014 |
| EP | 3048044 A1 | 7/2016 |

OTHER PUBLICATIONS

English Translation of the International Search Report dated Dec. 18, 2020, issued in corresponding International Application No. PCT/EP2020/081392, filed on Nov. 6, 2020, 3 pages.
(Continued)

*Primary Examiner* — Jake Cook
(74) *Attorney, Agent, or Firm* — Christensen O'Connor Johnson Kindness PLLC

(57) ABSTRACT

A gear element includes a support (3) on which first rollers (10a) and second rollers (10b), which are intended for engaging with the teeth of a neighboring gear element (2), are alternately mounted. Each roller (10a, 10b) is mounted for rotation about its longitudinal axis (X') via rotary guide means (20) cooperating with end portions of the rollers (10a, 10b). The rotary guide means (20) of the first rollers (10a) and the rotary guide means (20) of the second rollers (10b) are staggered in the vicinity of an outer periphery of the support (3).

9 Claims, 3 Drawing Sheets

(56) References Cited

U.S. PATENT DOCUMENTS

2016/0215855 A1* 7/2016 Christensen .......... H02K 7/116
2019/0346024 A1* 11/2019 Nagumo ............... F16C 13/006

OTHER PUBLICATIONS

English Translation of the Written Opinion dated Dec. 18, 2020, issued in corresponding International Application No. PCT/EP2020/081392, filed on Nov. 6, 2020, 3 pages.

* cited by examiner ated with a gear reducer proposing a particularly high torque. The gear formed by the pinion and the ring gear must thus be done without sliding and have a clearance that is as low as possible to resist the torque of the motor, in particular during start-up where the torque is delivered relatively suddenly.

ROLLER GEAR ELEMENT

CROSS-REFERENCES TO RELATED APPLICATIONS

This application is a National Stage of International Application No. PCT/EP2020/081392, filed Nov. 6, 2020, which claims priority to French Patent Application No. 1912588, filed Nov. 8, 2019, the entire disclosures of which are hereby incorporated by reference.

TECHNICAL FIELD

Embodiments of the present disclosure relate to a roller gear element, in particular although not exclusively to an aircraft motorised wheel.

BACKGROUND

In the field of aviation it is now provided to equip aircraft with members for rotationally drive wheels to allow the movement of the aircraft on the ground without using its powertrains. Generally, these drive members comprise an electric motor connected to a gear reducer, the output of which is equipped with a pinion. The pinion cooperates with a ring gear integral with the aircraft wheel. In this way, the electric motor rotates the pinion, which itself drives the ring gear and therefore the wheel to move the aircraft.

Naturally, this drive type requires the use of an electric motor associated with a gear reducer proposing a particularly high torque. The gear formed by the pinion and the ring gear must thus be done without sliding and have a clearance that is as low as possible to resist the torque of the motor, in particular during start-up where the torque is delivered relatively suddenly.

Such a gear type is made possible via the use of a roller pinion, which comprises a plurality of rollers intended to cooperate with the teeth of the ring gear. The rollers are generally supported and guided in rotation by bearings equipped with self-lubricated pads allowing to prevent sliding with the teeth of the ring gear. Thus, two rollers are, at any time, in contact with one same tooth of the ring gear, which allows a transmission without clearance with a very high yield.

However, the pads are recognised to be replacement parts that must be replaced regularly to avoid premature wear of the rollers and of the teeth of the ring gear, which leads to significant maintenance time and maintenance costs.

Moreover, with the admissible load on the pads being limited, the row of teeth of the ring gear and the row of rollers of the pinion are generally doubled. The pinion is thus coupled with the output shaft of the gear reducer via a cardan joint-type coupling device, ideally with elastic return to a neutral position which allows both to transfer the torque from the output shaft of the gear reducer to the pinion and to guarantee a simultaneous contact of the two rows of teeth with the two rows of rollers by enabling a slight inclination of the pinion with respect to the ring gear. Such a coupling device leads to a mass and an additional complexity.

OBJECT OF THE DISCLOSURE

The object of the disclosure is to propose a gear element allowing to prevent at least some of the abovementioned problems.

SUMMARY

To this end, a gear element according to the disclosure is proposed, comprising a support on which are alternately mounted first rollers and second rollers which are intended to cooperate with teeth of a neighboring gear element. Each roller is mounted for rotation about its longitudinal axis via rotary guide means cooperating with end portions of the rollers.

According to the disclosure, the rotary guide means of the first rollers and the rotary guide means of the second rollers are staggered in vicinity of an outer periphery of the support.

According to a preferred embodiment of the disclosure, the rotary guide means of the first rollers extend partially facing the rotary guide means of the second rollers about the axis of rotation of the gear element, which allows to maximize the number of rollers of the gear element as regards the bulk of the rotary guide means.

Particularly, the rotary guide means of the first rollers and the rotary guide means of the second rollers are identical.

Particularly, the first rollers and the second rollers are identical.

According to a particular characteristic of the disclosure, the rotary guide means of the first rollers and/or the rotary guide means of the second rollers comprise at least one ball bearing.

In a manner known per se, ball bearings enable high radial loads, which allows the gear element to support significant drive torques without necessarily doubling the row of rollers of the gear element.

Moreover, it is recognized that ball bearings have a high service life, allowing the limit the maintenance time and maintenance costs of the gear element.

Particularly, the ball bearing is a radial rolling-element bearing.

According to another particular characteristic of the disclosure, the longitudinal axes of the first rollers and of the second rollers are parallel to the axis of rotation X of the gear element.

The disclosure also relates to an assembly for driving an aircraft wheel, comprising a first gear element connected in rotation to the wheel and a second gear element connected in rotation to a motor, at least one of the gear elements being of the preceding type.

Also, an object of the disclosure is an aircraft comprising at least one wheel provided with such a drive assembly.

DESCRIPTION OF THE DRAWINGS

The disclosure will be best understood in the light of the following description, which is purely illustrative and non-limiting, and must be read regarding the accompanying drawings, among which.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The disclosure is described here applied to an assembly for driving an aircraft wheel, comprising a first gear element connected in rotation to the wheel and a second gear element connected in rotation to a motor.

Figure 1:
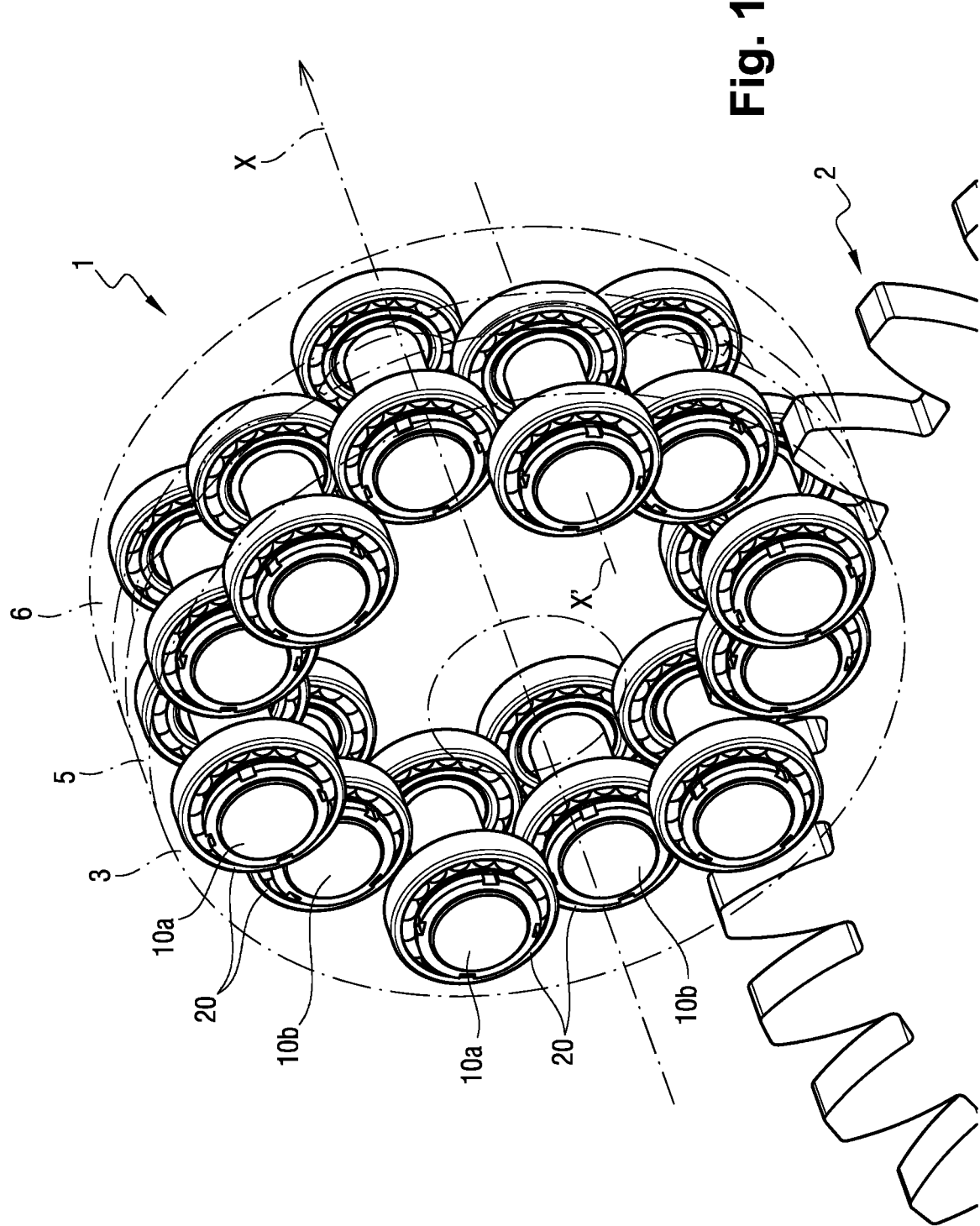
FIG. 1 is a perspective view of a gear element according to a particular embodiment of the disclosure, of which rollers cooperate with teeth of a ring gear.

In reference to FIG. 1, the disclosure comprises a gear element 1 which is in contact with a ring gear 2 comprising a row of teeth. The gear element 1 has an axis of rotation X parallel to an axis of rotation of the ring gear 2.

The gear element 1 comprises a support 3 on which a plurality of first rollers 10a and of second rollers 10b symmetrically distributed about the axis of rotation X are alternately mounted.

The support 3 comprises a central core 4, the shape of which is similar to that of a straight tube, the longitudinal axis of which is combined with the axis of rotation X of the gear element. The central core 4 has ends respectively provided with a first flange 5 and a second flange 6. The first flange 5 and the second flange 6 have a general circular ring shape of a central axis combined with the axis of rotation X. The first flange 5 and the second flange 6 extend radially projecting outwards from the central core 4 and therefore have substantially identical outer diameters, which are greater than the outer diameter of the central core 4. The first flange 5 and the second flange 6 thus together delimit a recess, the bottom of which is formed by the outer surface of the central core 4.

The first flange 5 comprises an outer face on which bores 5a open out, identical and symmetrically distributed about the axis of rotation X in the vicinity of the outer periphery of the first flange 5. Each of the bores 5a is cylindrically-shaped with an axis parallel to the axis of rotation X. The centres of the bores 5a enter on one same circle, the centre of which is located on the axis of rotation X.

The first flange 5 also comprises an inner face on which bores 5b open out, identical and symmetrically distributed about the axis of rotation X in the vicinity of the outer periphery of the first flange 5. Each of the bores 5b is cylindrically-shaped with an axis parallel to the axis of rotation X. The centres of the bores 5b enter on one same circle, the centre of which is located on the axis of rotation X and the diameter of which is identical to that of the circle on which the centres of the bores 5a enter.

The number of bores 5b is identical to the number of bores 5a and the diameter of the bores 5b is identical to that of the bores 5a.

Moreover, the bores 5b are angularly offset with respect to the bores 5a such that when the support 3 is seen along the axis of rotation X, the bores 5b appear as interposed evenly between the bores 5a, the central axis of each of the bores 5b being equidistant from the central axes of the two neighboring bores 5a and each of the bores 5b partially extending facing the two neighboring bores 5a.

Similarly, the second flange 6 comprises an inner face and an outer face on which the bores 6a and the bores 6b open out respectively, which are respectively facing the bores 5a and the bores 5b of the first flange 5. The bores 6a, 6b are of identical shape and diameter to the bores 5a, 5b. Thus, the bores 6a, 6b are cylindrically-shaped and are symmetrically distributed about the axis of rotation X in the vicinity of the outer periphery of the second flange 6. In the same way, the centres of the bores 6a, 6b enter on one same circle, the centre of which is located on the axis of rotation X.

In each bore 5a, 5b of the first flange 5, a radial rolling element ball bearing 20 is tightly fitted, which is immobilized in translation via locking rings 30. The rollers 20 mounted in the bores 5a, 5b are thus staggered, each of these rollers being axially offset with respect to its two neighboring ones and partially extending facing one another, along the axis of rotation, of the two neighboring rollers 20.

Preferably, the rollers 20 comprise, on each side, a lateral protection formed, for example, by an flange or a synthetic rubber seal allowing to ensure a lifetime lubrication of the rollers 20.

Figure 2:
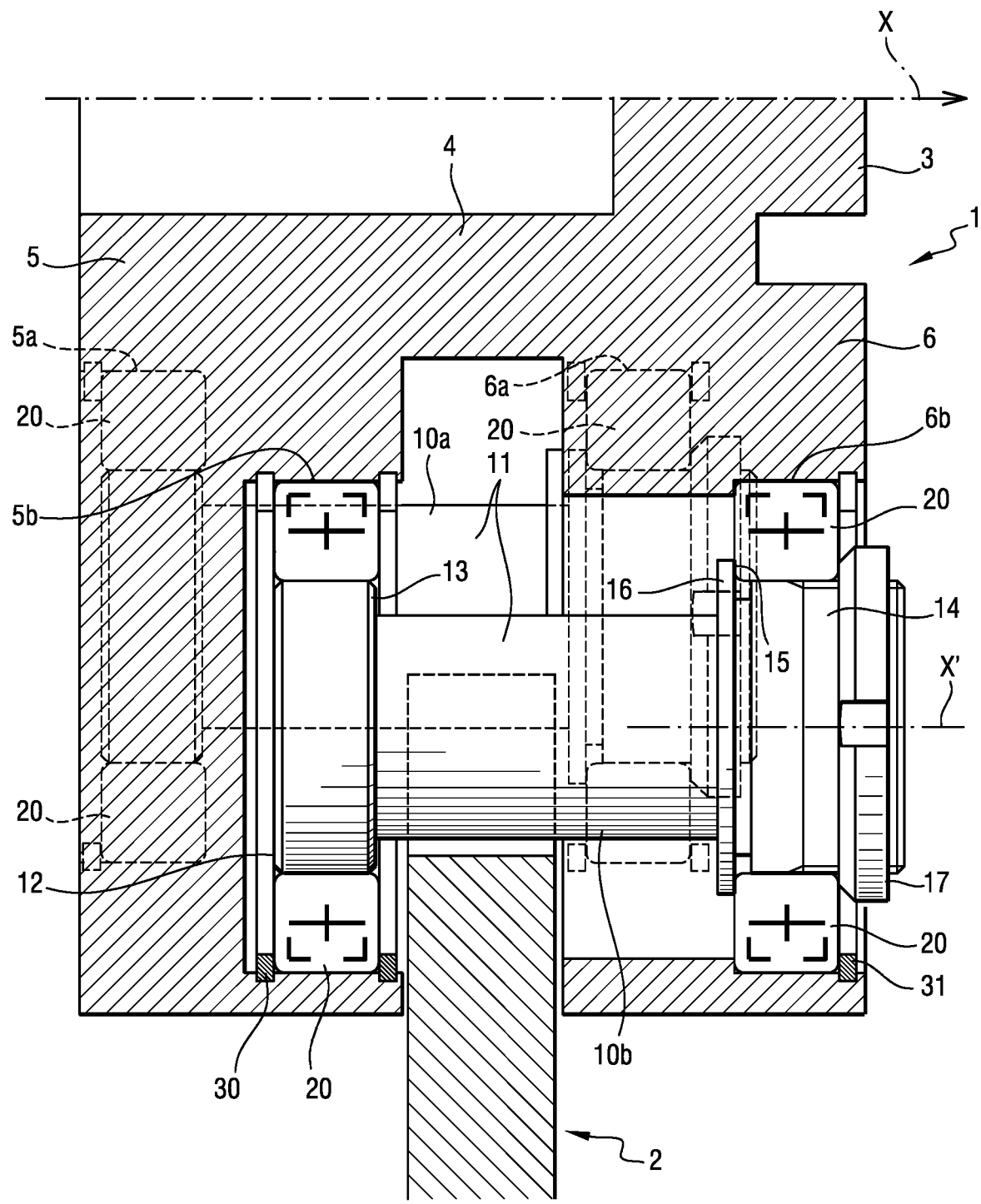
FIG. 2 is a view of the gear element illustrated in FIG. 1, as a cross-section by a plane passing through the axis of rotation of the gear element and the longitudinal axis of one of the rollers.
Figure 3:
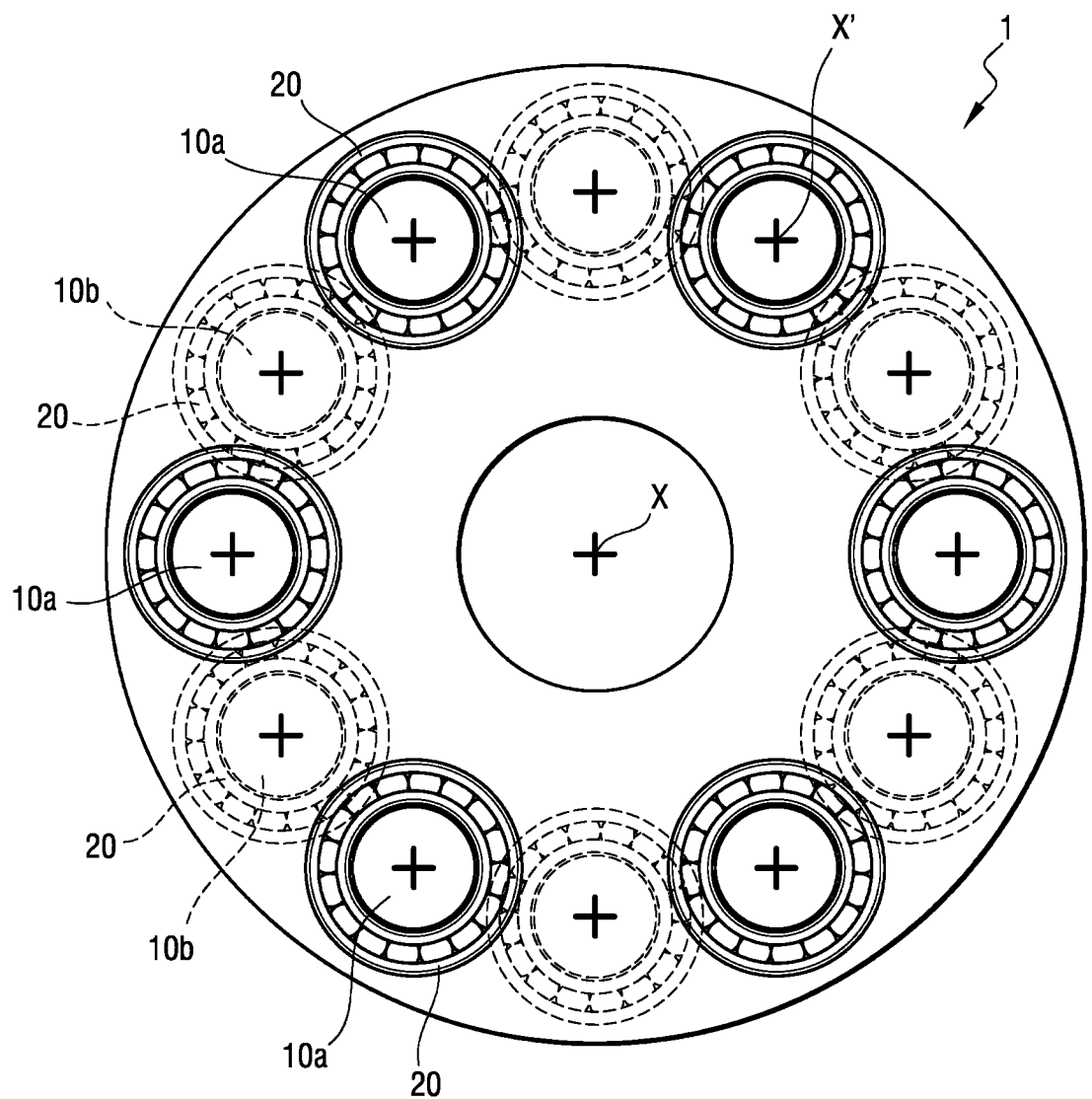
FIG. 3 is a side view of the gear element illustrated in FIG. 1.

In reference to FIG. 2, the first rollers 10a and the second rollers 10b are identical. They comprise a main section 11 having an end provided with a collar 12 radially projecting, defining a first shoulder 13 and another end provided with a cylindrical surface of a greater diameter which is extended by a threaded portion 14 and which is connected to the main section by a second shoulder 15 and a third shoulder 16 forming an abutment. The diameters of the collar 12 and of the cylindrical surface are substantially identical.

Each cylindrical surface extended by the threaded portion 14 receives a ball bearing 20 which is held in position against the shoulder 16 via a nut 17 screwed on the threaded portion 14.

The gear element 1 illustrated in FIG. 1 comprises six rollers 10a and six rollers 10b, that is twelve rollers in total. The rollers 10a, 10b are inserted into the support 3 by the housings 6a, 6b following a translation along the longitudinal axis X' of each of the rollers 10a, 10b, of the second flange 6 to the first flange 5.

The collars 12 of the rollers 10a are thus introduced into the inner rings of the rollers 20 tightly fitted in the bores 5a of the first flange 5, while the bores 6a of the second flange 6 receive the outer rings of the bearings 20 mounted on the threaded portions 14 of the rollers 10a.

Likewise, the collars 12 of the rollers 10b are thus introduced into the inner rings of the bearings 20 tightly fitted in the bores 5b of the first flange 5 receive the collars 12 of the rollers 10b, while the bores 6b of the second flange 6 receive the outer rings of the bearings 20 mounted on the threaded portions 14 of the rollers 10b.

The rollers 20 mounted on the cylindrical surfaces extended by the threaded portions 14 of the rollers 10a, 10b are thus staggered, each of these rollers being axially offset with respect to its two neighboring ones and partially extending facing one another, along the axis of rotation, of the two neighboring rollers 20.

Subsequently, the rollers 10a, 10b are mounted for rotation on the support 3 about their longitudinal axis X' and are staggered in the vicinity of the periphery of the flanges 5, 6 of the support.

Holding the rollers 10a, 10b in the support 3 is ensured by locking rings 31 immobilizing in translation along the longitudinal axis X' the outer ring of the bearings 20 received in the bores 6a, 6b of the second flange.

The rotation of the gear element 1 about its axis X thus itself leads to the rotation of the ring gear 2, the rollers 10a, 10b entering successively into contact with the teeth of the ring gear 2. The rollers 10a, 10b in fact allow to engage without sliding with the row of teeth of the ring gear 2. Ideally, the teeth of the ring gear 2 are shaped to cooperate without clearance with the rollers 10a, 10b.

The gear element 1 and the ring gear 2 thus forming a conventional straight gear, wherein the rollers 10a, 10b rotate about the axis of rotation X of the gear element 1, but also about their longitudinal axis X'.

Naturally, the disclosure is not limited to the embodiments described, but covers any variant entering into the scope of the disclosure, such as defined by the claims.

Although the gear element 1 can be likened to a pinion as regards FIG. 1, the diameter of the gear element 1 can be greater than that of the ring gear 2.

Although the gear element 1 here cooperates with a ring gear 2, the gear element 1 can, for example, cooperate with a rack and pinion.

Although the diameters of the bores are here identical, these can vary from one flange to another, on the condition of not impeding the possibility of mounting rollers on the support of the gear element.

The rollers 20 can be of a type different from that illustrated in FIG. 2.

The immobilisation of the bearings in translation can be ensured differently from that illustrated in FIG. 2.

The support can be made of one single part, by machining, or of several parts. In the latter case, the flanges are, for example, directly mounted on the central hub, then welded on it; or assembled such that they cannot be dismounted, for example, by providing grooves for the immobilisation in rotation of the flanges with respect to the central hub and of the threaded/tapped element for their axial immobilisation.

Although the gear element has been described, applied to an assembly for driving an aircraft wheel, the disclosure is applicable to any type of gear train.

Although the bearings 20 are here ball bearings, other types of bearings can be considered, in particular tapered roller bearings or needle bearings.

The first rollers 10*a* and the second rollers 10*b* can be different, in particular concerning their dimensions. For example, the main section of the first rollers 10*b* can have a length different from that of the second rollers 10*b*. This is the same for the length of the collars and that of the cylindrical surfaces.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A gear element, comprising: a support on which first rollers and second rollers are alternately mounted and partially extend facing each other when looking in a direction perpendicular to an axis of rotation of the gear element, which first rollers and second rollers are configured for engaging with teeth of a neighboring gear element, each of the first rollers and second rollers being mounted for rotation about a longitudinal axis via rotary guide means cooperating with end portions of the first rollers and second rollers, wherein the rotary guide means of the first rollers and the rotary guide means of the second rollers are staggered.

2. The gear element according to claim 1, wherein the rotary guide means of the first rollers partially extend facing the rotary guide means of the second rollers when looking in a direction parallel to the axis of rotation of the gear element.

3. The gear element according to claim 1, wherein the rotary guide means of the first rollers and the rotary guide means of the second rollers are identical.

4. The gear element according to claim 3, wherein the first rollers and the second rollers are identical.

5. The gear element according to claim 1, wherein at least one of the rotary guide means of the first rollers or the rotary guide means of the second rollers comprise at least one ball bearing.

6. The gear element according to claim 5, wherein the ball bearing is a radial rolling-element bearing.

7. The gear element according to claim 2, wherein the longitudinal axes of the first rollers and of the second rollers are parallel to the axis of rotation of the gear element.

8. A drive assembly for driving an aircraft wheel, comprising: a first gear element connected in rotation to the aircraft wheel and a second gear element connected in rotation to a motor, wherein at least one of the first gear element or the second gear element is a gear element according to claim 1.

9. An aircraft comprising at least one aircraft wheel provided with the drive assembly according to claim 8.

* * * * *